(No Model.)
J. T. COOPER.
FERTILIZER DISTRIBUTER.
No. 261,682. Patented July 25, 1882.
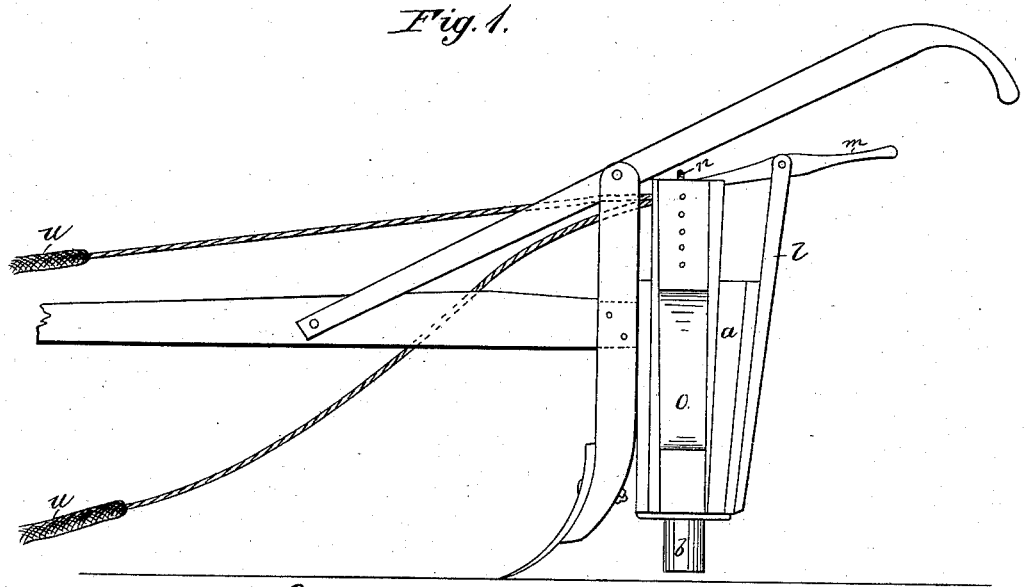
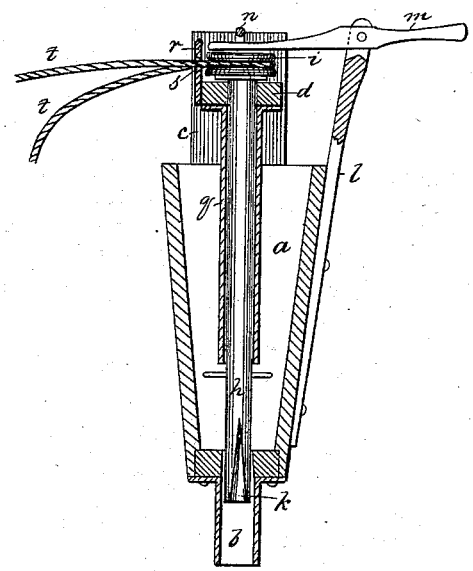
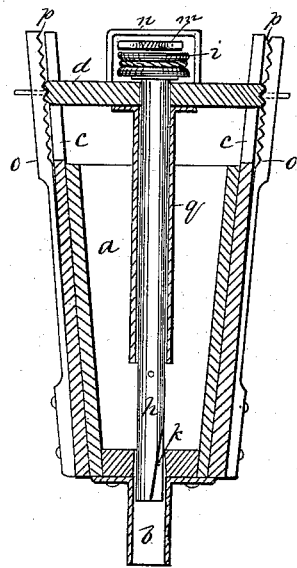
WITNESSES:
W. W. Hollingsworth
W. Read
INVENTOR:
John T. Cooper
BY
ATTORNEYS.

UNITED STATES PATENT OFFICE.

JOHN T. COOPER, OF SOMERVILLE, ALABAMA.

FERTILIZER-DISTRIBUTER.

SPECIFICATION forming part of Letters Patent No. 261,682, dated July 25, 1882.

Application filed October 10, 1881. (No model.)

*To all whom it may concern:*

Be it known that I, JOHN THOMAS COOPER, of Somerville, in the county of Morgan and State of Alabama, have invented a new and useful Improvement in Fertilizer-Distributers; and I do hereby declare that the following is a full, clear, and exact description of the same, reference being had to the accompanying drawings, forming part of this specification, in which—

Figure 1 is a side elevation of my improved fertilizer-distributer. Fig. 2 is a vertical longitudinal section. Fig. 3 is a vertical transverse section.

My invention relates to improvements in fertilizer-distributers; and it consists in the peculiar construction and arrangement of the parts, as hereinafter more fully set forth.

In the accompanying drawings, $a$ represents an ordinary fertilizer-hopper, preferably secured to the rear end of a plow-beam, or to a plow-frame, so that the fertilizer contained therein will be conducted by a tube, $b$, attached to the bottom of the hopper directly into the furrow made by the plow.

To the outer faces of two of the opposite sides of the hopper $a$ are secured the arms $c$, projecting above the mouth of the hopper, and having their projecting ends slotted to receive the tenoned ends of a cross-head, $d$, adapted to move back and forth in the slots.

The cross-head $d$ is provided with a circular orifice in its middle, through which passes a shaft, $h$, having a pulley, $i$, secured to its upper end, which rests on the upper face of the cross-head $d$.

The shaft $h$ is provided at its lower end with a groove, $k$, enlarged at the end of the shaft and gradually tapering upward to a point, through which groove the fertilizer from the hopper passes into the tube $b$, and thence into the furrow made by the plow. The length of the groove $k$ in the shaft $h$ is such that when the cross-head $d$ is forced down to the bottom of the slots in the arms $c$ the whole of the tapering groove $k$ in the shaft lies below the circular orifice in the bottom of the hopper in which the shaft $h$ slides, and the flow of the fertilizer from the hopper is cut off.

By raising the cross-head $d$, and with it the shaft $h$, to the top of the slots in the arms $c$ the flow of the fertilizer from the hopper would be greatest; and the flow of the fertilizer may be varied, as desired, by raising or lowering the shaft, which is also provided with a stirrer-pin.

$l$ represents a standard secured to the outer face of the back side of the hopper.

$m$ represents a lever, having its fulcrum in the upper end of the standard $l$, and extending back, so as to be readily operated by the plowman, when desired, without stopping the plow.

The front end of the lever $m$ is enlarged and passes under a bail, $n$, secured to the upper face of the cross-head $d$, and straddling the pulley $i$, whereby the cross-head $d$ and shaft $h$ can be raised or lowered, as desired, by the lever $m$, to vary the flow of the fertilizer from the hopper or cut it off entirely.

In order to regulate the quantity of the fertilizer to be distributed, so that any desired amount per acre will be distributed uniformly in a furrow, I employ the following devices: $o\ o$ represent spring-plates, each secured at its lower end to the lower part of one of the slotted arms $c$, the upper free ends of the spring-plates projecting upward and covering the slots in the arms $c$. The inner faces of the spring-plates $o$ over the slots are serrated or provided with ratchet-teeth $p$, which engage in a groove made in the end of each of the tenons at the extremities of the cross-head $d$. By this construction the plowman can raise or lower the lever to vary the flow of the fertilizer, as desired, or to cut it off entirely without stopping the plow; or by means of the spring-plates engaging with the cross-head he can fix the distribution of the fertilizer so that any desired quantity shall be distributed uniformly in a furrow.

$q$ represents a sleeve or tube secured to the under face of the cross-head $d$, and surrounding and concentric with the shaft $h$ and extending some distance along it, in which the shaft operates. The function of the sleeve is to prevent the fertilizer from pressing against the shaft $h$.

$r$ represents a guide-plate secured to the outer longitudinal edge of the cross-head $d$, and provided with a horizontal slot, $s$, for the passage of the two ends of a cord, $t$, passing partly around the pulley $i$, the two ends thence passing through the guide-slot s. The ends of the cords t are each provided with a piece of rubber, u, which are secured to the fore legs of the draft-horse of the plow. By this construction a rocking motion is given the pulley i and shaft h to prevent the feed from being clogged.

The object of employing rubber or other elastic material at the outer ends of the cord is to prevent any strain on the machine and horse, arising from any irregularity in the step of the latter, by the rubber giving in consequence of its elasticity.

The upper projecting ends of the arms c are provided with several holes, so that a pin can be put through either of the holes, thereby stopping the cross-head d and the shaft h, when being raised, at any desired point.

I claim as my invention—

1. In a fertilizer-distributer, the combination, with the hopper a, provided with slotted arms c, of a cross-head, d, vertically adjustable in said slotted arms, shaft h, journaled in the cross-head, and provided with a tapering groove, k, in its lower end, and lever m, substantially as described, and for the purpose set forth.

2. The combination, with the hopper a, slotted arms c, cross-head d, shaft h, turning in the cross-head, and provided with the tapering groove k and lever m, of the spring-plates o, provided with ratchet-teeth p, substantially as described, and for the purpose set forth.

3. The combination of the hopper a, slotted arms c, cross-head d, having bail n, spring-plates o, provided with ratchet-teeth p, shaft h, having tapering groove k, and pulley i, standard l, and lever m, substantially as described, and for the purpose set forth.

JOHN THOMAS COOPER.

Witnesses:
A. R. WILSON,
W. T. MORROW.